United States Patent [19]

Watson et al.

[11] Patent Number: 4,926,842
[45] Date of Patent: May 22, 1990

[54] IMMERSION TUBE HEATER TREATER IMPROVED IMMERSION TUBE HEATER TREATER

[75] Inventors: James E. Watson, Southgate, Mich.; Theodore E. Davies, Hudson, Ohio

[73] Assignee: North American Mfg. Co., Cleveland, Ohio

[21] Appl. No.: 352,702

[22] Filed: May 10, 1989

Related U.S. Application Data

[63] Continuation of Ser. No. 49,577, May 11, 1987, abandoned.

[51] Int. Cl.$^5$ .............................................. F24H 1/20
[52] U.S. Cl. .............................. 126/360 R; 126/91 A; 432/181; 432/180
[58] Field of Search ................ 126/360 R, 360 A, 369, 126/91 R, 91 A, 368, 366; 432/180, 181, 54, 214; 431/166, 170, 349; 122/136 R, 149, 14, 17

[56] References Cited

U.S. PATENT DOCUMENTS

| | | | |
|---|---|---|---|
| 3,749,082 | 7/1973 | Brock | 126/360 A |
| 4,014,316 | 3/1977 | Jones et al. | 126/91 A |
| 4,355,973 | 10/1982 | Bailey | 126/91 A |
| 4,604,051 | 8/1986 | Davies | 126/91 A |

FOREIGN PATENT DOCUMENTS 29416 8/1971 Japan .............................. 126/360 R Primary Examiner—James C. Yeung
Attorney, Agent, or Firm—Woodling, Krost & Rust

[57] ABSTRACT

An improved immersion tube heater means is disclosed for uniformly and reliably heating oils to a temperature below the oil's critical physical breakdown temperature so as to avoid damage to the oil and coating the tube with damaged oil byproducts.

6 Claims, 4 Drawing Sheets

IMMERSION TUBE HEATER TREATER IMPROVED IMMERSION TUBE HEATER TREATER

BACKGROUND OF THE INVENTION

This present invention relates to a device and method for reliably improving the heat distribution of immersion tubes for heating chemical substances having critical physical breakdown temperatures. The invention is described in the atmosphere of heater-treaters used for degassing, heating and dehydrating condensable petroleum based oils.

The typical heater-treater currently is a large horizontal or vertical positioned vessel utilizing a continuous tube heater extending between a single burner and an exhaust. This heater heats the oil within the vessel to a sufficient temperature so as to process the oil, separating free gasses, water, suspended solids (sand, etc.) and other foreign matter from the oil during the heating and subsequent physical processing of the oil. The products of combustion from the burner are confined within the tube with the tube transferring the heat thereof to the surrounding oil. This typical heater is serviceable. Unfortunately, however, there normally is a poor distribution of burner heat within the tube; since a single burner is used, it is impossible to control the temperature uniformity of the tube throughout its length. The burner is therefore operated with little concern for the maximum temperature at any location of the tube or the temperature distribution between longitudinal areas of the tube, significantly shortening the service life of the tube (due to thermal stress) and in addition physically damaging at least some percentage of the treated oil (due to operating close to the maximum stable temperature of the oil, causing coking, and/or altering the chemical structure of part of the oil—causing degradation of the service life of the oil)and also the heater tube (the buildup of physical deposits of carbon, coke et al on the outside surface of the tube reduce the boundary layer heat transfer efficiency—in effect insulating the tube from the oil—causing hot spots in the tube). This type of burner operation is also fuel inefficient. Given the current costs of fuel, this adds a measure of cost to the heat transfer process.

SUMMARY OF THE INVENTION

The invention of this present application is directed towards reliably, uniformly heating the tube of a heater treater to a temperature range below the maximum stable temperature of the oil and above the minimum temperature needed to treat the oil so as to increase tube life.

It is an object of this invention to maximize the BTU safely transferred to the fluid while proving longer tube life by avoiding excessive tube temperatures.

BRIEF DESCRIPTION OF THE DRAWINGS

The heater-treater embodiment of the invention is described by way of example in drawings in which.

DETAILED DESCRIPTION

Figure 1:
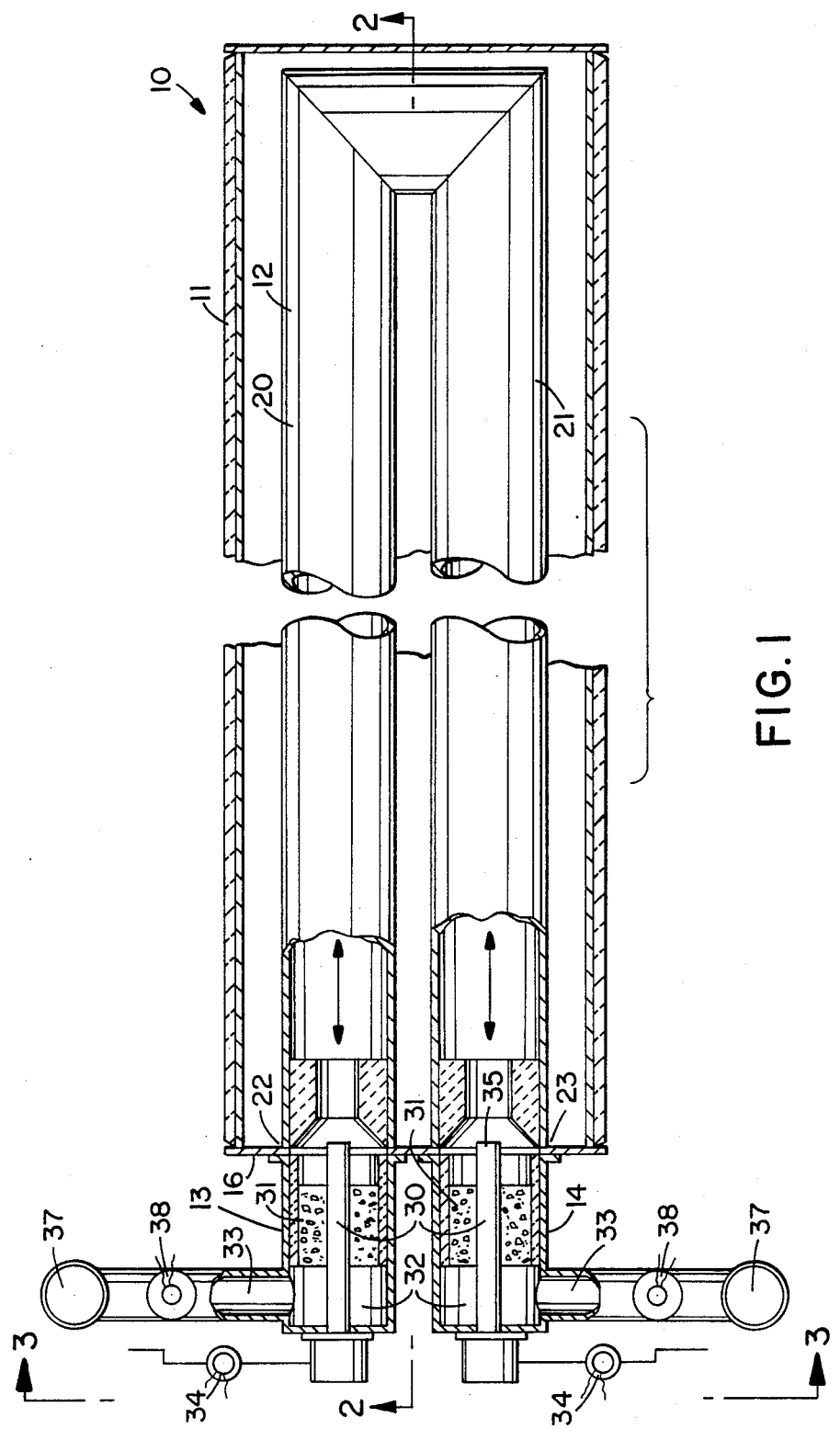
FIG. 1 is a longitudinal downward facing cross-sectional view of the heater-treater incorporating the invention.

The heater treater 10 of the figures includes a containment vessel 11, a heating tube 12 and two bi-directional regenerative burners 13, 14.

The containment vessel 11 is designed to hold the oil being heated. The containment vessel 11 shown is a steel cylinder 8 feet in diameter and 40 feet long. This containment vessel 11 can be the heating section of an emulsion treatment tank as shown in U.S. Pat. Nos. 3,389,536 and 4,329,159 or otherwise. If the containment vessel 11 is used as a heater-treater it would in addition contain the physical baffles, subchambers and settling areas (all not shown) used in the treatment of the oil. The vessel 11 could also be used as a pipeline heater, emulsion heater, or other type of mechanism for raising the temperature of a substance. The purpose of this containment vessel 11 is to contain the mechanism to raise the temperature of the fluid or substance entering it.

Normally the heat to accomplish this rise in temperature is applied by means of a unidirectional generally "U" shaped heating tube having a burner at one end and an exhaust stack at the other. The tube itself is oriented with one leg above the other leg. This type of heater, however, while inexpensive is plagued with problems such as damaged heated fluid (due to the burner's operating at or exceeding the desired range of temperature for the fluid near the burner), short tube life (due to the thermal stresses on the heater tube due to poor distribution of heat by itself and due to the coating of the tube by damaged oil) and high operational costs (due to the inefficiency of the heater). The industry accepts these problems as a cost of operating primarily due to the lack of acceptable alternatives.

The heater tube of this present invention is a preferable alternative to prior art devices.

In the containment vessel 11 of the present invention heat is provided to the heating tube 12 by means of two bi-directional regenerative burners 13, 14.

The heating tube 12 is a generally "U" shaped tube with two legs 20, 21. This tube 12 isolates the oil from the products of combustion while permitting the heat transfer from such products to the surrounding oil. In an existing installation the physical size, location, and heat capabilities of the heating tube 12 would conform to the space and BTU requirements of such existing location. This would insure a continuity of the operating parameters in such installation. In a new installation the physical size and heat capabilities of the heating tube 12 would be designed to optimize the heat transfer between the tube 12 and surrounding oil. In the specific embodiment described herein the tube 12 itself is 36 inches in diameter and 60 feet in total length. Each leg 20, 21 is 30 feet long. The legs 20, 21 are parallel to and are separated from each other by about six inches throughout their longitudinal length.

Figure 2:
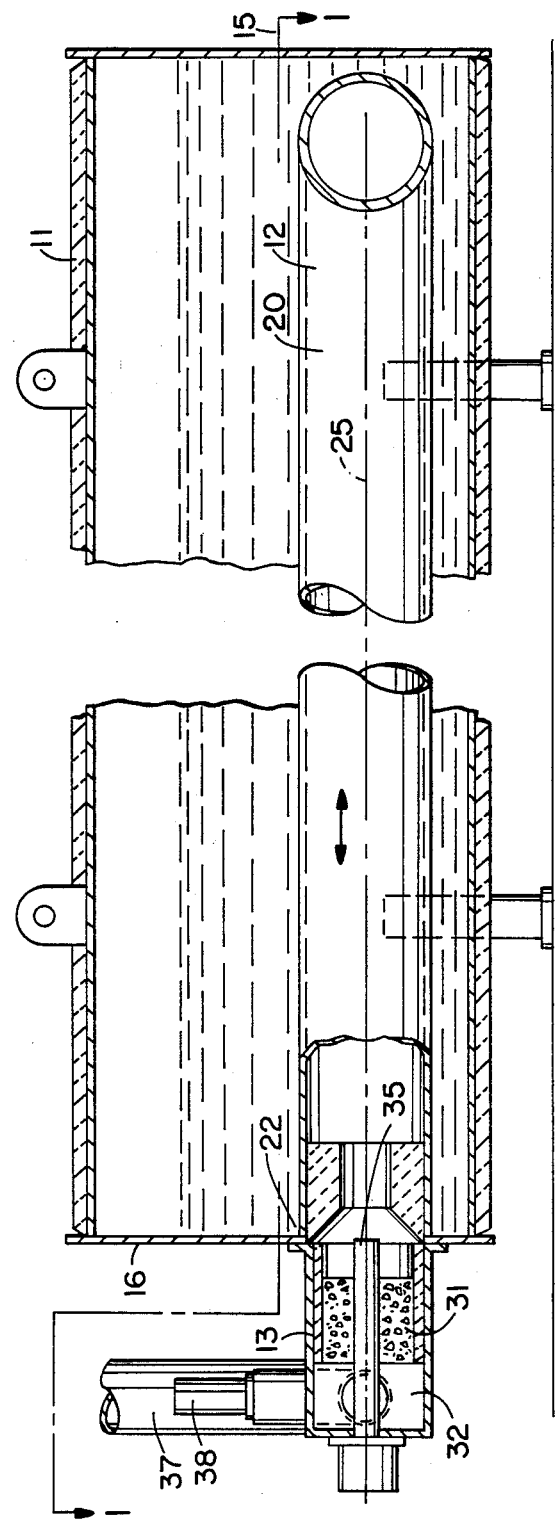
FIG. 2 is a longitudinal sidewards facing cross-sectional view of the heater-treater of FIG. 1.
Figure 3:
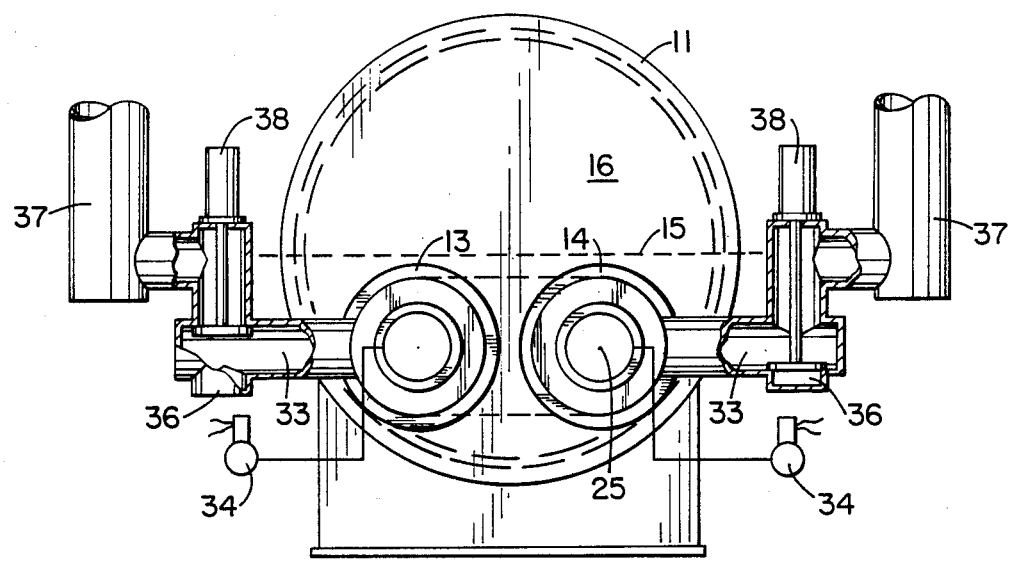
FIG. 3 is a view of the burner end face of the heater-treater of FIG. 1.

The heating tube 12 is located within the containment vessel 11 near the bottom thereof (see FIGS. 2,3). The longitudinal axis 25 of the tube 12 is some 20 inches below the central plane 15 of such containment vessel 11. The two legs 20, 21 are horizontally displaced in respect to each other. The two ends 22, 23 of the heating tube 12 are bolted to one end 16 of the containment vessel 11 to form a leakproof seal thereto.

The two bi-directional burners 13, 14 are bolted to the end 16 of the containment vessel 11 axially aligned with the legs 20, 21 of the heating tube 12. Each burner 13, 14 includes a fuel tube 30, a regenerative bed 31, a plenum 32 and an intake/discharge duct 33. Although a specific type of burner is disclosed (regenerative with a self-contained radial regenerative bed) other types of burners could be utilized if desired.

The fuel tube 30 is located within the burner extending coaxially with the central axis 25 of the heating tube 12. The fuel tube 30 is connected via a valve 34 to a suitable source of gaseous or other fuel. The inner end 35 of the fuel tube 30 incorporates a nozzle suitable for injecting the chosen fuel into the surrounding combustion air. An igniter of some nature (not shown) is also incorporated into the burner to ignite the fuel/air mixture.

The duct 33 of each burner is alternately selectably connected to either a source of combustion air 36 and an exhaust 37 via a selectively operated plunger valve 38. The duct 33 provides combustion air to a firing burner and exhausts waste air from an inactive burner through the valve 38 (one duct 33 to combustion air 36, the other duct 33 to exhaust 37).

In a firing mode of a burner, combustion air enters the duct 33 to swirl about the plenum 32. Normally a blower pressurizes the air entering the intake duct at 36 to facilitate the operation of the burner. The combustion air then passes axially through the heat storage material in the cylinder regenerative bed 31, picking up any residual heat contained therein. Fuel from the fuel tube 35 is then mixed with the combustion air and ignited.

Combustion of the fuel/air mixture takes place throughout the heating tube 12 (although primarily in the leg containing the firing burner).

The combusted air passes axially through the heat storage material in the regenerative bed 31 of the inactive burner giving up any residual heat thereto, then through the plenum 32 and duct 33 to an exhaust at 37.

After a certain period of time the burners 13, 14 reverse their operation with the firing burner cycling to inactive and the inactive burner firing. In the firing mode of each burner the combustion air is heated as it passes through a heated regenerative bed 31 before combustion. In the inactive mode of each burner the hot combusted air is cooled as it passes through a cool regenerative bed 31 giving up heat before exhaust, heating the regenerative bed in the process. The size of the burners, the time that each burner is operated, the heat storage capabilities of the regenerative beds, the size and length of the heating tube, and other factors are synergistically adjusted so as to heat the fluid within a certain preselected temperature range. This preselected temperature range is selected to be beneath the critical physical breakdown temperature (for example the coking temperature of oil) but above the minimum treating temperature (for example the dewatering temperature of oil). There is a critical boundary layer of fluid immediately adjacent to the outer surface of the heating tube 12. If the physical breakdown temperature for the substance being heated is approached (particularly in the critical boundary layer), the substance undergoes some degree of physical damage. This damage is important for its resultant effects on the continuing operation of the heater and on its own merits. In respect to its resultant effects, part of the substance physically damaged will build up on the external surface of the heating tube 12—for overheated oil, carbon and coke will build up. This buildup is very undesirable. From the first stages of buildup, the material on the tube 12 will reduce the efficiency of heat transfer—in effect providing insulation for the tube. As the material builds up, it will also cause hot spots and uneven heat distribution in the tube. This produces further thermal stresses on the tube, shortening its service life even more. In addition one end of the tube (the end with most buildup) could begin running hotter than the other end, further reducing the overall efficiency of heat transfer. The heating tube is thus itself prone to physical damage due to the physical breakdown of the heated substance surrounding it. In respect to its own merits, in addition to this tube damage other damage also exists. For example: the service life of oil (in engines) is diminished as the operating temperature increases—as much as 50% reduction for a 20 degree rise in the temperature. The viscosity and other qualities of the oil are also detrimentally modified by increased temperature. One therefor preferably would operate devices to produce an oil temperature just above that necessary to produce the desired physical qualities in the oil; anything more will compromise the physical properties of the oil more than absolutely necessary. In fact one normally accepts a higher temperature after performing some sort of cost/benefit analysis. For example: a heater-treater operates more productively at higher temperatures. One therefor has more throughput accepting some over heating of the oil being treated. Additional example: pipeline heaters can be more widely spaced along the pipeline if each heater produces a greater input-output temperature differential. One lowers the cost of the heaters by again utilizing higher temperatures. Therefor for any device an analysis will produce a commercially acceptable temperature value 72 (FIG. 4) perhaps different from the maximum allowable and minimum allowable values. The invention of this application allows one to take this commercially acceptable temperature value 72 into consideration by insuring that the heater can produce a temperature even within the range from this commercially acceptable temperature 72 value and the maximum allowable value 70 (FIG. 4) if desired. Due to this present invention, the entire length of the heating tube is within this preselected temperature range, maximizing the BTU transfer rate into the fluid while promoting longer tube life by avoiding excessive temperatures.

The size of the burners 13, 14 is chosen such that continuous operation of the burners will provide the BTU input necessary to heat the fluid in the containment vessel 11 to the desired temperature range. The volume and viscosity of fluid, flow rate, heat losses and other parameters are considered in this calculation.

The time that each burner 13, 14 is operated for each cycle depends primarily on the heat transfer capabilities of the heating tube 12. Ideally each burner is operated for a length of time necessary to avoid exceeding the maximum allowed temperature for each leg while at the same time retaining both legs of the heating tube 12 within the desired temperature range, i.e. between 70 and 71 (preferably 72) (in FIG. 4).

The regenerative beds 31 are sized such that their storage capabilities are reached when the opposing burner is operated for its cycle and their storage capabilities are substantially discharged when the bed's burner is operated. In the regenerative bed 31 shown the storage parameters are altered by varying the overall total surface area of the particles within the bed i.e. using a greater number of smaller particles in a fixed volume bed for greater heat transfer. (Subject to the allowable pressure drop across the bed.)

The size and length of the heating tube 12 is dependent primarily on the overall size of the containment vessel 11 and the volume and velocity of the fluid passing therethrough. In general the greater the volume of the fluid the more surface area is needed in a shorter package.

The 36 inch diameter tube of our example heater-treater device is designed for ten million British thermal units an hour (BtuH) input with one hundred twenty thousand standard cubic feet per hour (ScFH) products of combustion. Each burner 13, 14 is therefor sized so as to individually provide ten million BtuH input with both the burners producing the ScFH product of combustion through sequential ten to sixty second intermittent operation (30 seconds preferred). The operation of these burners produces an average gas temperature ranging symmetrically in an arc from 2200 degrees F. near the burners 13, 14 to substantially 1800 degrees F. near the center of the tube 12 (line 50 in FIG. 5). The temperature of the outside of the tube 12 ranges symmetrically in an arc at a lower temperature—650 degrees near the burners 13, 14 to substantially 560 degrees near the center of the tube 12 (line 51 in FIG. 4). In contrast a conventional ten million BTuH burner produces an average gas temperature declining substantially linearly from 2600 degrees F. near the burner to substantially 700 degrees F. near the exhaust opening (line 60 in FIG. 5) and an outside tube temperature declining substantially linearly from 700 degrees F. near the burner to substantially 360 degrees F. near the exhaust opening (line 61 in FIG. 4). The advantages of the invention of this application are apparent from these temperature curves.

In the ideal heater, the curve of the temperature of the outside of the tube would be a straight line just below the maximum allowable temperature 70 of the substance being heated. This would optimize heat transfer by using all of the outside surface area of the tube equally at a maximum rate while also avoiding the tube and other damage that would occur if this temperature was exceeded.

Figure 4:
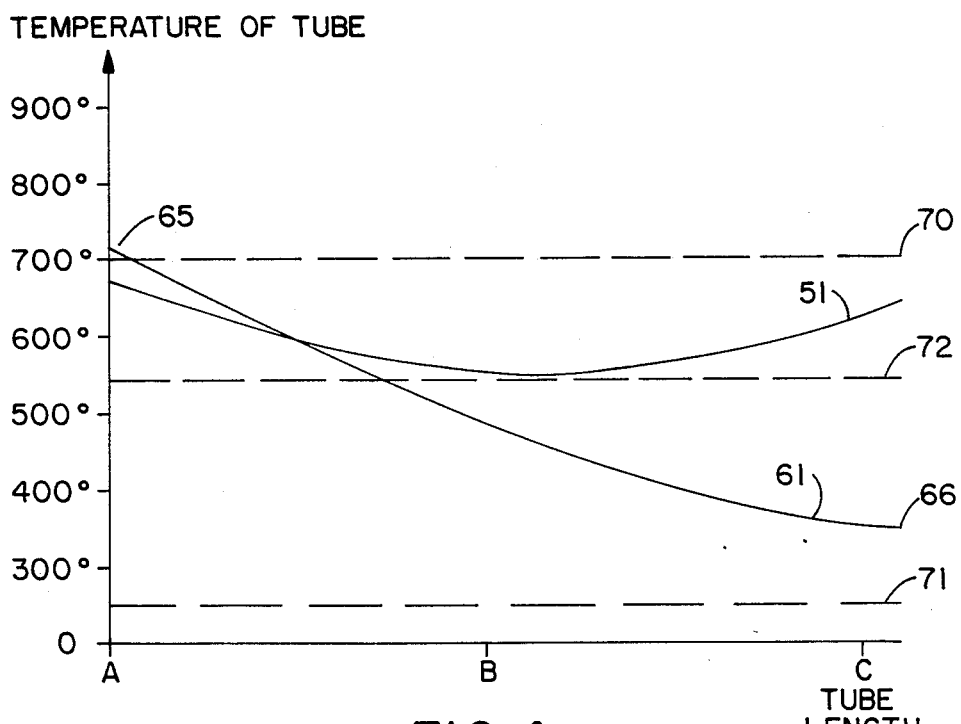
FIG. 4 is a graph of the temperature of the outer surface of the heater tube of FIG. 1 with superimposed desired maximum and minimum temperatures.
Figure 5:
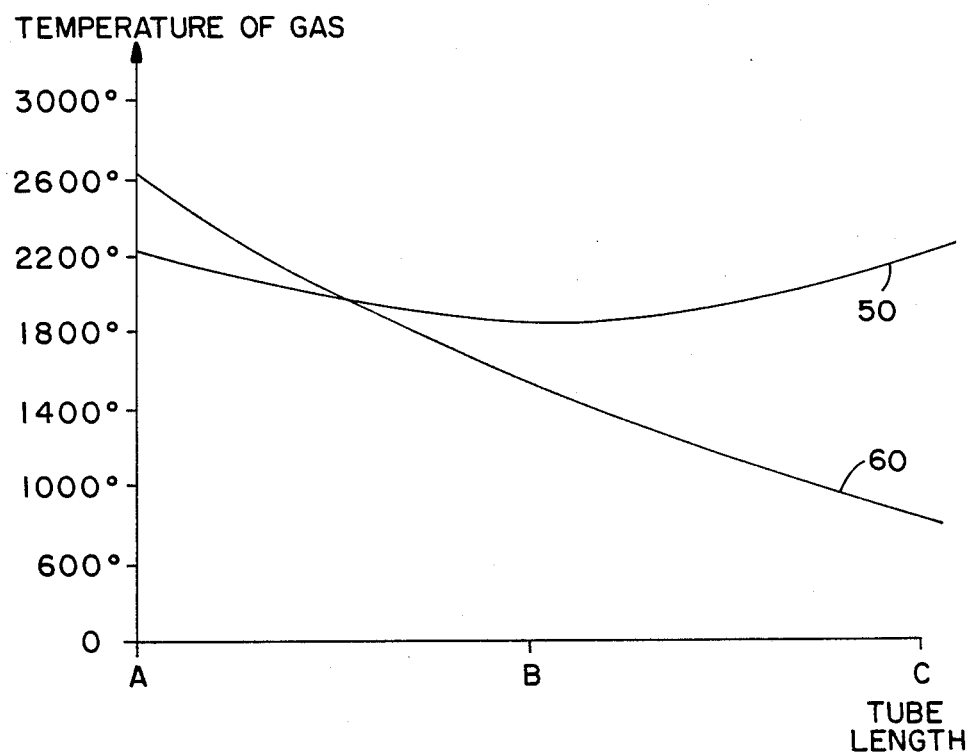
FIG. 5 is a graph of the temperature of the gas within the heater tube of FIG. 1.

In a conventional heater (lines 60, 61), in order to maximize heat transfer the maximum temperature of the outside of the tube (point 65 in FIG. 4) must be as close to if not exceeding the maximum allowable temperature of the substance being heated (in our example a 700 degree F. coking temperature for oil—line 70 in FIG. 4) and the minimum temperature of the outside of the tube (point 66 in FIG. 4) must be above the minimum desired temperature of the substance being heated (in our example a 250 degree F. fluid temperature for oil—line 71 in FIG. 4). The temperature distribution of this conventional heater is skewed, producing a thermal and operational imbalance. In respect to the thermal imbalance, the 50%, 350 degree F. temperature drop in a 60 foot length of tube speaks for itself. The thermal stress on the tube is readily apparent. In addition, because the burner must be operated at as high a rate as possible the minimal differential between the maximum temperature of the tube—point 65—and the maximum allowable temperature of the fluid—line 70—almost guarantees that at least part of the heated oil will be thermally damaged. Indeed given the urge for more "productivity" it is logical to expect that an operator of the conventional burner would normally exceed the designed parameters—i.e. turn the burner even higher—increasing the maximum temperature of the tube, point 65, and the amount of thermal damage even further. In any event, with the minimal or nonexistent safety factor of this conventional heater, a measure of physical damaged oil is certain: even with a safety factor any imbalance of the tube will cause spots on the tube to exceed the coking temperature for the oil. (In addition, although a 700 degree coking temperature is shown, even a given oil will contain a certain percentage that will coke at lower temperatures). With this physical damage, carbon and coke will begin building up on the external surface of the heating tube causing the insulation effects, hot spots and thermal imbalance previously discussed. These insulation effects, hot spots and thermal imbalance will in turn cause the temperature of areas of the tube to exceed the maximum allowable temperature causing further damage with the same continued burner operation (i.e. the curve 61 will increase in temperature at the hot end for a single, steady state burner operation). The conventional tube can thus be subjected to increasing temperatures leading to even quicker burn out. The heat transfer characteristics of the example conventional burner tube are also skewed—14,572 BtuH near the burner: 4033 BtuH/square foot near the exhaust: 9,303 BtuH arithmetical average. This uneven heat transfer distribution must be compensated for in the point of entry, exit, volume, velocity, direction and time of fluid heating in the device to insure at least some minimum level of the functioning—further decreasing the efficiency of operation of the device.

In the invention of this application the temperature of the outside of the tube, line 51, is more uniform throughout the length of the tube 12, indeed it approaches the ideal. With a more equal heat transfer throughout the entire length of the tube 12, the device can be operated more conservatively while still providing a significant improvement over the conventional device. It is therefor not necessary that the maximum temperature of the tube 12 be so close to the critical maximum allowable temperature, line 70, of the fluid being treated. This allows the heating of the oil without much thermal damage thereto. Avoiding the thermal damage to the oil also minimizes the buildup on the external surface of the heating tube 12, prolonging tube life. Even with a 50 degree safety factor the overall heat transfer characteristics of the heater of this invention are significantly above that of a conventional device: 12,456 BtuH/square foot near the burners 13, 14: 10,247 BtuH at the center of the tube 12: 11,352 BtuH arithmetical average. This represents a 12% increase in average heat transfer characteristics over the conventional heater. It also means that less attention must be paid to the fluid flow through the device, with volume now the main parameter. The uniformity of the temperature throughout the length of the tube 12, a plus or minus 50 degree differential, greatly reduces the thermal stresses on the tube 12; the device lasts longer. In addition it allows the device to be operated above the commercially acceptable temperature 72 without significant compromise. The ability to lower the maximum tube temperature avoids thermal damage to the heated substance, as well as avoiding the problems of foreign matter buildup (i.e. tar from coked oil) on the outside of the tube. The invention thus accomplishes more than merely increasing operating efficiencies of the heater: it maximizes the BTU's that can be safely transferred into the fluid while promoting longer tube life by avoiding excessive temperatures.

The heater disclosed is utilized to heat oil for a heater treater. In this or any other type of device it is important to heat the substance, in this case oil, so as to raise the temperature and lower the viscosity a minimum temperature) but not by utilizing a heater having a temperature at any point above the physical breakdown temperature of the substance, for example coking in oil (a maximum temperature). The invention of this present application produces just such a heater.

Therefor, although the invention has been described in its preferred form with a certain degree of particularity, it is to be understood that numerous changes can be made without departing from the invention as hereinafter claimed.

What is claimed is:

1. An improved heater for a containment vessel of an oil having a coking temperature of substantially 700 degrees F. and a desired temperature of substantially 250 degrees F., said improved heater comprising an immersion heater tube, said heater tube having two ends, said heater tube being in the containment vessel in contact with the oil, a bi-directional burner, said bi-directional burner being affixed to one end of said heater tube coaxially therewith, said bi-directional burner having an air intake/exhaust plenum, a second bi-directional burner, said second bi-directional burner being affixed to the other end of said heater tube coaxially therewith, said second bi-directional burner having an air intake/exhaust plenum, and control means to selectively operate said bi-directional burner and said second bi-directional burner by firing said burners and connecting said plenums of said burners to air intake or exhaust as appropriate to heat the entire length of the heater tube substantially uniformly to a temperature at least the desired temperature of 250 degrees F. but below the coking temperature of 700 degrees F. of the oil.

2. The improved heater of claim 1 characterized in that said bi-directional burner and said second bi-directional burners are cycled by said control means in bursts of ten to thirty second each.

3. The improved heater of claim 1 characterized in that said heater tube has an outside surface and said outside surface of said heater tube having a temperature range of substantially 560 to 650 degrees F.

4. The improved heater of claim 1 wherein said heater tube has a BTuH/square foot output and a center and characterized in that said BTuH/square foot output ranges from substantially 10,247 at the center of said heater tube to substantially 12,456 near said burners.

5. The improved heater of claim 1 wherein the coking of the oil would otherwise leave damaging buildup on the external surface of said heater tube.

6. An improved heater for a containment vessel of an oil having a coking temperature of substantially 700 degrees F. and a desired temperature of substantially 250 degrees F., said improved heater comprising an immersion heater tube, said heater tube having two ends a center and an outside surface, said heater tube being in the containment vessel in contact with the oil, a bi-directional burner, said bi-directional burner being affixed to one end of said heater tube coaxially therewith, said bi-directional burner having an air intake/exhaust plenum, a second bi-directional burner, said second bi-directional burner being affixed to the other end of said heater tube coaxially therewith, said second bi-directional burner having an air intake/exhaust plenum, and control means to selectively operate said bi-directional burner and said second bi-directional burner by firing said burners in bursts of ten to thirty second each and connecting said plenums of said burners to air intake or exhaust as appropriate to heat the entire length of the heater tube substantially uniformly from substantially 10,247 BTuH/square foot at the center of said heater tube to substantially 12,456 BTuH/square foot near to said burners to a temperature ranging from 560 to 650 degrees F. to raise the temperature of the oil to at least the desired temperature bu below the coking temperature of the oil so as to reduce coking of the oil and the buildup of coked oil on the outside surface of said heater tube.

* * * * *